(12) United States Patent
Huang et al.

(10) Patent No.: US 10,690,262 B2
(45) Date of Patent: Jun. 23, 2020

(54) WATER HAMMER-PROOF AIR VALVE AND WATER HAMMER-PROOF EXHAUST METHOD FOR IN-USE PIPELINE

(71) Applicant: ZHUZHOU SOUTHERN VALVE CO. LTD., Hunan (CN)

(72) Inventors: Jing Huang, Hunan (CN); Xinchun Gui, Hunan (CN); Jinpeng Tang, Hunan (CN); Jianguo Yin, Hunan (CN); Qiuhong Xu, Hunan (CN); Aihua Xie, Hunan (CN); Aihua Tang, Hunan (CN)

(73) Assignee: ZHUZHOU SOUTHERN VALVE CO. LTD., Hunan (CN)

( * ) Notice: Subject to any disclaimer, the term of this patent is extended or adjusted under 35 U.S.C. 154(b) by 73 days.

(21) Appl. No.: 15/579,498

(22) PCT Filed: May 30, 2016

(86) PCT No.: PCT/CN2016/083881
§ 371 (c)(1),
(2) Date: Dec. 4, 2017

(87) PCT Pub. No.: WO2016/192603
PCT Pub. Date: Dec. 8, 2016

(65) Prior Publication Data
US 2018/0149287 A1 May 31, 2018

(30) Foreign Application Priority Data
Jun. 5, 2015 (CN) .......................... 2015 1 0304974

(51) Int. Cl.
*F16K 47/02* (2006.01)
*F16K 24/04* (2006.01)
(Continued)

(52) U.S. Cl.
CPC ................ *F16K 47/02* (2013.01); *F16K 1/14* (2013.01); *F16K 21/18* (2013.01); *F16K 24/044* (2013.01);
(Continued)

(58) Field of Classification Search
CPC ...... F16K 21/18; F16K 24/042; F16K 24/044; F16K 24/046; F16K 31/18; F16K 31/20;
(Continued)

(56) References Cited

U.S. PATENT DOCUMENTS 3,770,001 A * 11/1973 Davis ...................... F16K 15/04
137/202
4,579,140 A * 4/1986 Sekine .................. F16K 24/046
137/202

(Continued)

FOREIGN PATENT DOCUMENTS

CN 102135186 A 7/2011
CN 104373742 A 2/2015
(Continued)

OTHER PUBLICATIONS

International Search Report and Written Opinion of the International Searching Authority for International Patent Application No. PCT/CN2016/083881, with English translation of Search Report, dated Aug. 18, 2016, 10 pages.

*Primary Examiner* — Hailey K. Do
(74) *Attorney, Agent, or Firm* — JCIPRNET

(57) ABSTRACT

A water hammer-proof air valve that has a valve body and a bonnet, that are fixedly connected, a valve opening is provided on the valve body, and a high-speed intake and exhaust device is provided in an inner cavity of the valve body. A bonnet opening is provided on the bonnet, an output end of the high-speed intake and exhaust device penetrates the bonnet opening and is communicated with a high-speed (Continued)

exhaust throttling device for limiting an exhaust amount of gas of the high-speed intake and exhaust device, an output end of the high-speed exhaust throttling device is communicated with an outside air, and a trace exhaust device for discharging the gas separated out from the pipeline to the outside through the high-speed exhaust throttling device after the high-speed intake and exhaust device closes the valve is further provided in the high-speed intake and exhaust device.

9 Claims, 4 Drawing Sheets

(51) Int. Cl.
| | | |
|---|---|---|
| *F16K 31/22* | (2006.01) | |
| *F16K 21/18* | (2006.01) | |
| *F16L 55/055* | (2006.01) | |
| *F16K 47/08* | (2006.01) | |
| *F16K 1/14* | (2006.01) | |
| *F16K 33/00* | (2006.01) | |
| *F16K 17/36* | (2006.01) | |
| *F16L 55/07* | (2006.01) | |

(52) U.S. Cl.
CPC ............ *F16K 31/22* (2013.01); *F16K 47/023* (2013.01); *F16K 47/08* (2013.01); *F16K 17/366* (2013.01); *F16K 24/046* (2013.01); *F16K 33/00* (2013.01); *F16L 55/055* (2013.01); *F16L 55/07* (2013.01); *Y10T 137/3099* (2015.04); *Y10T 137/7436* (2015.04)

(58) Field of Classification Search
CPC .......... F16K 31/22; F16K 33/00; F16K 47/02; F16K 47/023; F16K 47/04; F16K 47/08; Y10T 137/053; Y10T 137/2934; Y10T 137/296; Y10T 137/2968; Y10T 137/3099; Y10T 137/7426; Y10T 137/7423; Y10T 137/7436; F16L 55/05; F16L 55/055; F16L 55/045
See application file for complete search history.

(56) References Cited

U.S. PATENT DOCUMENTS

| | | | | |
|---|---|---|---|---|
| 2011/0146811 | A1* | 6/2011 | Miller | .................. F16K 24/044 137/409 |
| 2013/0220442 | A1* | 8/2013 | Balutto | ................. F16K 24/042 137/202 |

FOREIGN PATENT DOCUMENTS

| | | | | |
|---|---|---|---|---|
| CN | 104913111 A | 9/2015 | | |
| CN | 204828917 U | 12/2015 | | |
| FR | 2568346 A1 | * 1/1986 | .......... | F16K 24/042 |
| KR | 10-0735579 B1 | 6/2007 | | |

* cited by examiner

WATER HAMMER-PROOF AIR VALVE AND WATER HAMMER-PROOF EXHAUST METHOD FOR IN-USE PIPELINE

CROSS-REFERENCE TO RELATED APPLICATIONS

The present application is a national phase entry of International Application No. PCT/CN2016/083881, filed May 30, 2016, which claims priority to Chinese Patent Application No. 201510304974.3, filed Jun. 5, 2015, which are incorporated herein by reference in their entirety.

TECHNICAL FIELD

The present invention relates to the field of a water pipeline valve, and more specifically, to an overhead throttle exhaust type water hammer-proof air valve. In addition, the present invention relates to a water hammer-proof exhaust method for a pipeline in-use.

BACKGROUND

In a long distance water pipeline, air accumulated in the pipeline will reduce filling efficiency of the pipeline, or even make filling of the pipeline impossible to be successfully completed. Therefore, a high-speed intake and exhaust valve (air valve) is required to remove air in the pipe while filling the pipeline with water.

And the current high-speed intake and exhaust valve (air valve) mainly uses:

(i) Direct motion type or floating ball operation type high-speed intake and exhaust valve (air valve), will automatically exhaust a large amount of air when filling the blank pipe with water or suction a large amount of air when emptying the pipeline system; and under a condition that the system is filled and pressure exists, it will keep a closed state and never open again. However, its closing member can be easily seized by high-speed airflow during a high-speed exhaust process, and then suddenly blocks the exhaust vent, which leads to a blowing-block phenomenon or an air-block phenomenon. Once blowing-block occurs (i.e. the exhaust valve (air valve) closes), it will stay in the closed state for a long time. Even if the pipe is filled with air that needs to be exhausted, the air valve will not open for exhaust again. It will also cause the generation of a valve-closing water hammer of the air valve when blowing-block occurs.

(ii) Combined exhaust valve (air valve), adds a trace exhaust valve (air valve) on the basis of the direct motion type or floating ball operation type high-speed intake and exhaust valve (air valve). The combined exhaust valve can exhaust a trace amount of air under the condition that the system is filled and pressure exists, but cannot exhaust completely, cannot exhaust whenever air presents, sprays water while exhausting air, and has loose sealing. It cannot inhibit a cavity-closing water hammer and the valve-closing water hammer.

SUMMARY OF THE INVENTION

The present invention provides a water hammer-proof air valve and a water hammer-proof exhaust method for a pipeline in-use, to solve following technical problems on a current air valve: easy occurrence of a valve-closing water hammer; easy blowing-block during a high-speed exhaust; trace exhaust unable to realize an exhaust whenever air presents; unable to exhaust completely; and a phenomenon of spraying water while exhausting air.

According to one aspect of the present invention, it is provided a water hammer-proof air valve, comprising a valve body and a bonnet. The valve body and the bonnet are fixedly connected. A valve opening for being communicated with a pipeline is provided on the valve body, and a high-speed intake and exhaust device for discharging a gas retained in the pipeline to an outside during filling the pipeline with water and closing the valve after filling the pipeline with water is completed is provided in an inner cavity of the valve body. A bonnet opening is provided on the bonnet. An output end of the high-speed intake and exhaust device penetrates the bonnet opening and is communicated with a high-speed exhaust throttling device for limiting an exhaust amount of gas of the high-speed intake and exhaust device. An output end of the high-speed exhaust throttling device is in communicated with an outside air, and a trace exhaust device for discharging the gas separated out from the pipeline to the outside through the high-speed exhaust throttling device after the high-speed intake and exhaust device closes the valve is further provided in the high-speed intake and exhaust device.

Further, the high-speed intake and exhaust device comprises a casing which is fixedly connected to the bonnet and/or the valve body, a floating ball which is located in an inner cavity of the casing, and a sliding mass that caps on the floating ball and can slide up and down along an inner wall of the casing to open or close the valve. A ring cavity is formed between the casing and the valve body. An exhaust window for guiding the gas in the ring cavity to the output end of the high-speed intake and exhaust device is provided at an upper part of the casing. A bottom opening and a side opening for communicating the ring cavity and the inner cavity of the casing are provided at a bottom part of the casing. A clump weight for making a sealing face of the floating ball always face up is located in the floating ball. A part of the floating ball that carries the clump weight caps on the bottom opening.

Further, a plurality of exhaust windows are provided on the casing. The plurality of exhaust windows are distributed evenly along a circumference of the casing.

Further, a rubber bushing for cushioning a falling force of the floating ball is located at the bottom opening and/or the side opening.

Further, the trace exhaust device comprises an aperture that is located on the sliding mass and penetrates up and down, and a trace exhaust valve seat which is mounted at a bottom part of the aperture. An output end of the trace exhaust valve seat is communicated with the aperture. The floating ball abuts against and caps at an input end of the trace exhaust valve seat.

Further, the high-speed exhaust throttling device comprises a throttle tube which is fixedly connected to the bonnet and/or the valve body, and a throttle disc that is located at an inner cavity of the throttle tube and is used for sliding up and down along an internal face of the throttle tube to automatically adjust the exhaust amount of gas. A throttle orifice is provided on the throttle disc.

Further, a sealing disc which prevents a contamination from entering the valve body and forms a contact with the throttle disc that is ascending to limit an exhaust rate of a high-speed airflow is located at a top part of the high-speed exhaust throttling device.

Further, a shield for preventing a contamination from entering the valve body is located at the output end of the high-speed exhaust throttling device.

Further, at least two of the shield, the high-speed exhaust throttling device, the bonnet, and the valve body are fixedly connected by a connecting piece.

Further, a sealing ring is located between the high-speed exhaust throttling device and the bonnet, and/or between the bonnet and the valve body.

According to another aspect of the present invention, it is also provided a water hammer-proof exhaust method for a pipeline in-use, comprising: a) the pipeline changes from an initial state into a water filling and exhaust state, a gas in the pipeline enters an inner cavity of a valve body through an inlet of the valve body, an airflow enters an upper part of the valve body through a ring cavity between the valve body and a casing, the airflow is then discharged to an outside through an exhaust window of the casing, a bonnet opening of a bonnet, a flow surface between a throttle disc and a throttle tube, a sealing disc and a shield; b) as an exhaust rate keeps increasing, an exhaust pressure difference increases to a design value, the throttle disc is blown up by the airflow and blocks an exhaust opening of the throttle tube, leaving only an throttle orifice on the throttle disc for exhaust; c) as the gas in the pipeline is discharged, the exhaust rate and the exhaust pressure difference will gradually decrease, an airflow pushing force subjected by the throttle disc will also gradually decrease, when a dead-weight of the throttle disc is greater than the airflow pushing force, the throttle disc will fall to a bottom part of the throttle tube and returns to an initial location; at this moment, a water level rises, enters an inner cavity of the valve body, and drowns a floating ball and a sliding mass, the floating ball and the sliding mass float upward with the water level, a sealing face of the sliding mass contacts with a sealing ring, forming a sealing of an exhaust opening of the high-speed intake and exhaust device; an upper part of the floating ball contacts with a sealing face of the trace exhaust valve seat, forming a sealing of a trace exhaust opening; as a water pressure in the valve body increases, a seal specific pressure at a sealing part is increased, the valve closes, and neither water nor the gas can be discharged through the valve, realizing a sealing of the valve; d) after the valve closes, a mixed gas and/or a remained gas and/or a separated gas in the pipeline gradually gather to the upper part of the valve body of the high-speed intake and exhaust device which is located at a high point of the pipeline; as the gathered air increases, an air pressure rises to exceed the water pressure, on one hand keeping the sliding mass staying in a sealing state, on the other hand making the water level that drowns the floating ball fall; the floating ball falls with the water level and opens a sealing at the trace exhaust valve seat, and the trace exhaust valve seat starts to exhaust; when the gathered air pressure decreases, the water level rises, and the floating ball ascends with the water level and seals the trace exhaust valve seat again; and e) when the pipeline stops pumping, starts evacuating, or bursts, the water level in the air valve falls, an outside air pressure is greater than the water pressure in the pipeline, the sliding mass and the floating ball fall due to decreases of the water pressure and the water level, an intake and exhaust opening of the high-speed intake and exhaust device opens, and massive outside air is suctioned into the pipeline to eliminate vacuum in the pipeline.

The present invention has following beneficial effects:

The water hammer-proof air valve disclosed in present invention discharges air remaining in the pipeline while filling the pipeline with water. Even during the high-speed exhaust, the air valve will keep open, and no "blowing-block" phenomenon will occur. The valve will not close until an ascending water level closes the high-speed intake and exhaust device. The high-speed exhaust throttling device designed at an exhaust outlet can input throttling under a set exhaust amount and exhaust pressure difference, which only throttles the high-speed exhaust that may cause water hammer of cavity collapsing, and will not have any effect on high-speed air intake and trace exhaust. A cushion airbag playing a cushion role can be formed in the pipeline, preventing a pressure fluctuation of the pipe network caused by over-speed exhaust. The purposes of water hammer reduction and pipeline safety protection are achieved, and the valve-closing water hammer phenomenon that is unavoidable if the air valves of the prior art is employed is eliminated. The trace exhaust device is integrated inside the high-speed intake and exhaust device, having sealed contact, reliable disengagement and sensitive movement, which can truly realize an exhaust whenever air presents, an exhaust under full pressure, a complete exhaust, a function of exhaust without drain, and an improvement of conveyance efficiency of the pipeline. When pressure in the pipeline drops to nearly a negative pressure due to stopping pumping, evacuating, or bursting, the water pressure and the water level in the inner cavity of the air valve fall at the same time, and the valve opens so that the pipeline can suction air, which avoids vacuum or negative pressure occurring in the pipeline, and prevents pipeline collapsing caused by the negative pressure.

In addition to the purposes, features, and advantages described above, the present invention also has other purposes, features, and advantages. The present invention will be further described in detail below with reference to accompanying drawings.

DESCRIPTION OF THE DRAWINGS

The accompanying drawings which constitutes a part of the present application are provided to further explain the present invention. Schematic examples of the present invention and its illustration are used to explain the present invention, and do not constitute an improper definition of the present invention. In the accompanying drawings.

MARGINAL DATA 1. valve body; 2. bonnet; 3. valve opening; 4. high-speed intake and exhaust device; 401. casing; 402. floating ball; 403. sliding mass; 5. high-speed exhaust throttling device; 501. throttle tube; 502. throttle disc; 6. trace exhaust device; 601. aperture; 602. trace exhaust valve seat; 7. exhaust window; 8. rubber bushing; 9. sealing disc; 10. shield; 11. connecting piece; 12. sealing ring; 13. clump weight.

DETAILED DESCRIPTION OF THE INVENTION

Embodiments of the present invention described in detail below in combination with the accompanying drawings, but the present invention may be implemented by a plurality of different ways that are defined and covered.

Figure 1:
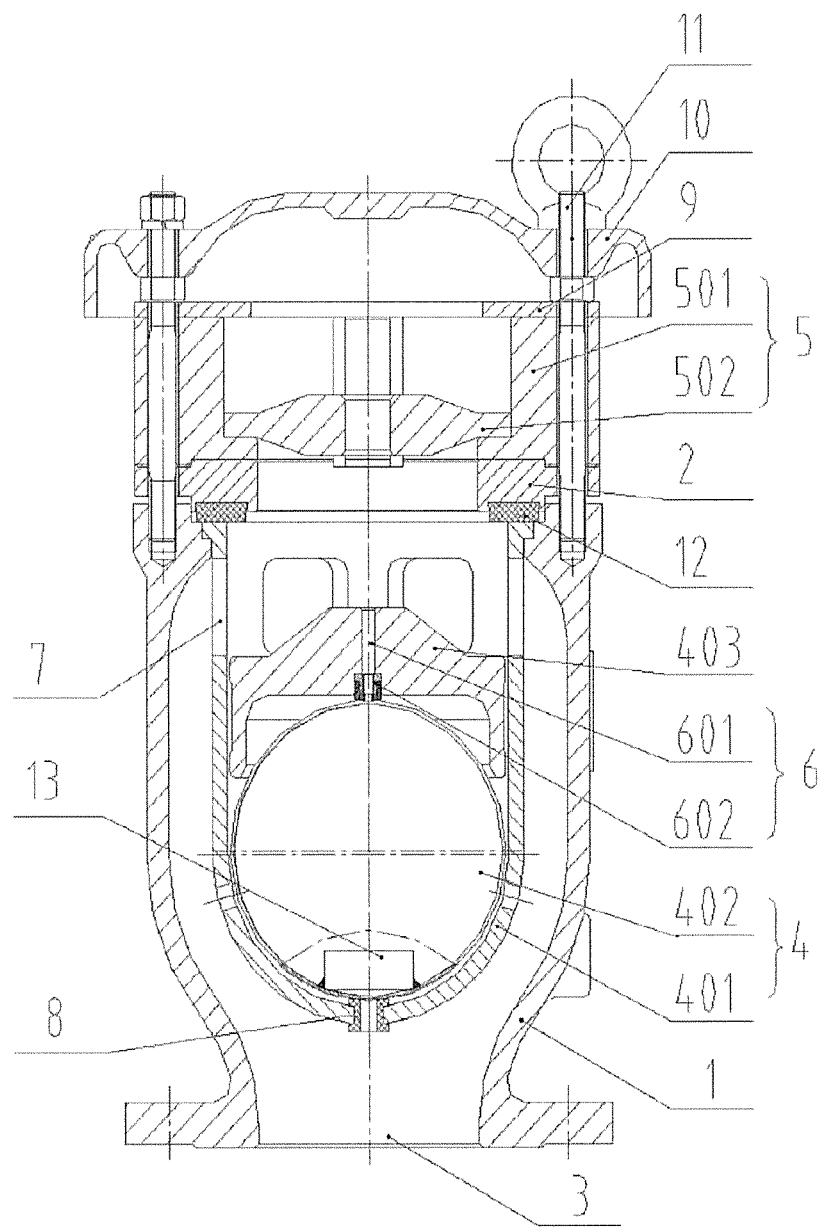
FIG. 1 is a structural representation of a trace exhaust valve seat and a throttle disc both not in a working state of a water hammer-proof air valve according to a preferred embodiment of the present invention.
Figure 2:
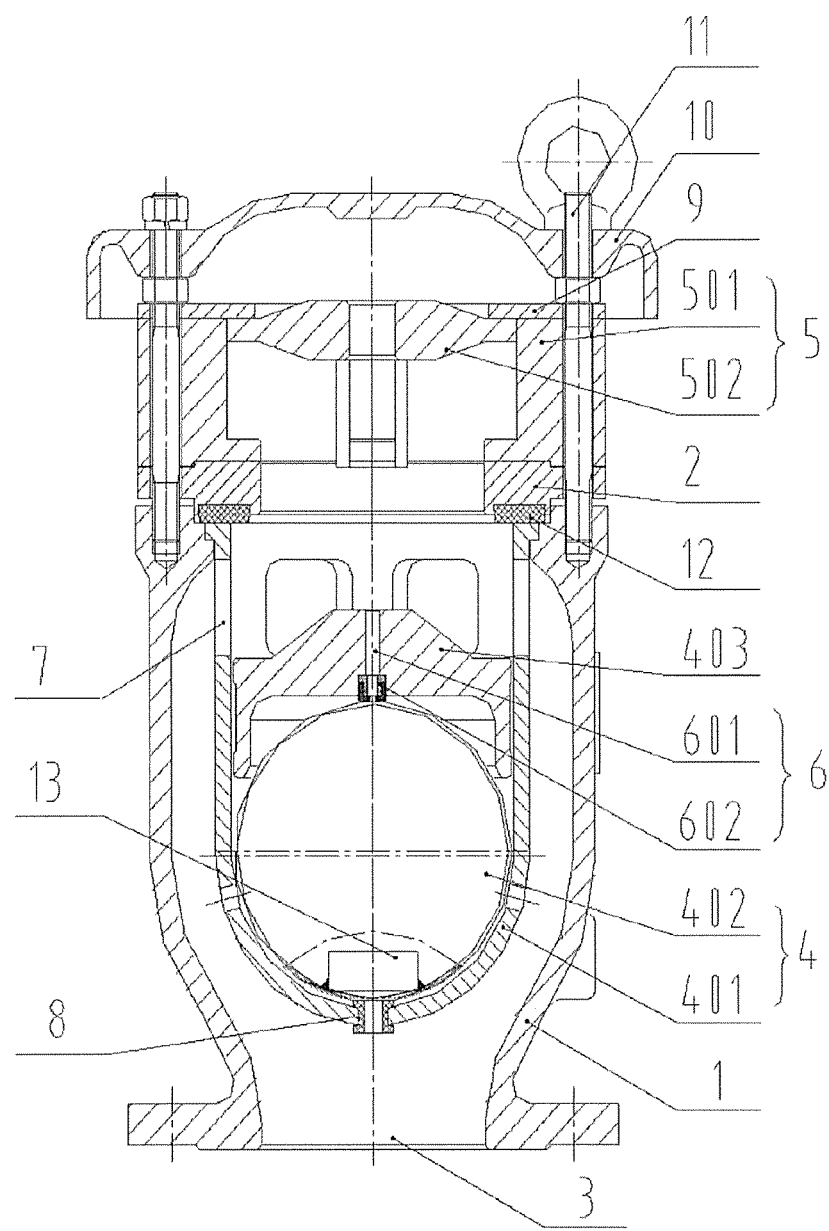
FIG. 2 is a structural representation of a trace exhaust valve seat not in a working state and a throttle disc in a working state of a water hammer-proof air valve according to a preferred embodiment of the present invention.
Figure 3:
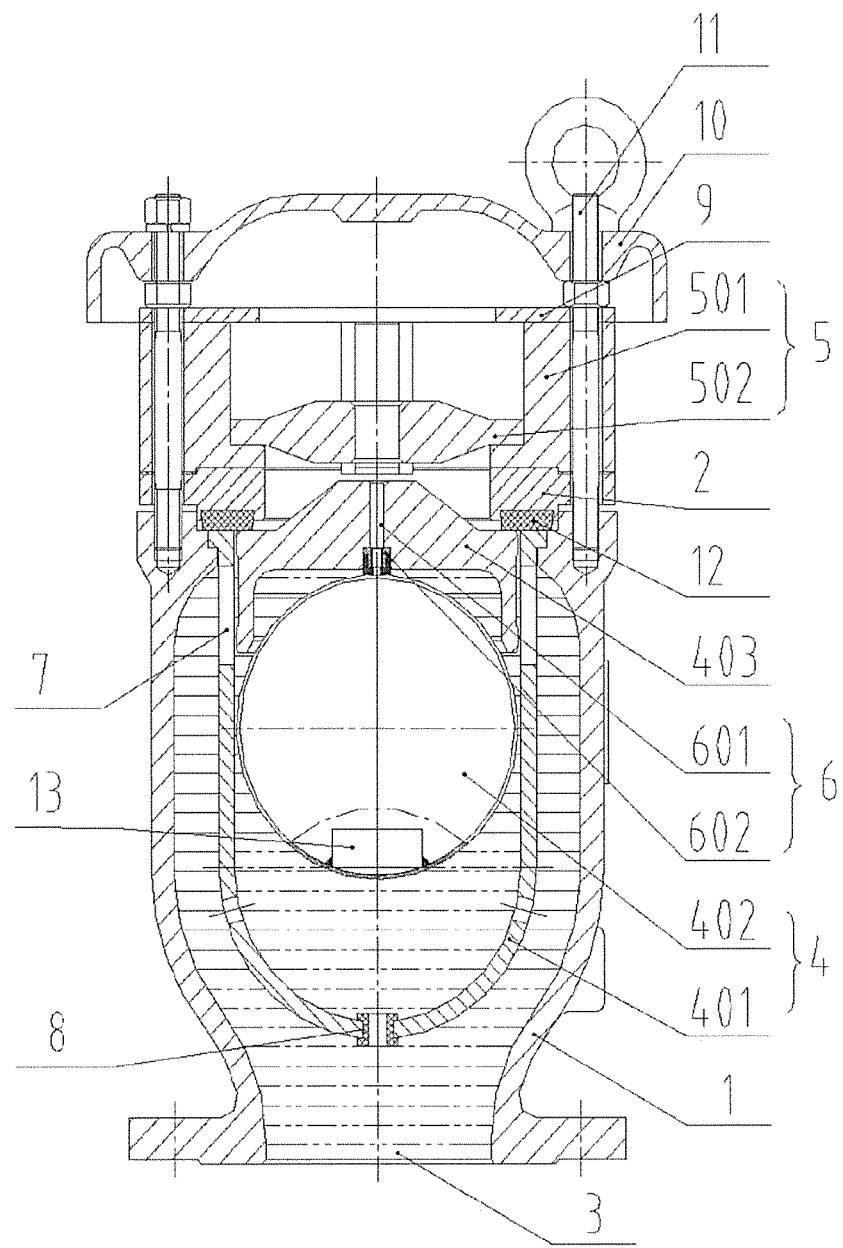
FIG. 3 is a structural representation of a trace exhaust valve seat in a working state and a throttle disc not in a working state of a water hammer-proof air valve according to a preferred embodiment of the present invention.
Figure 4:
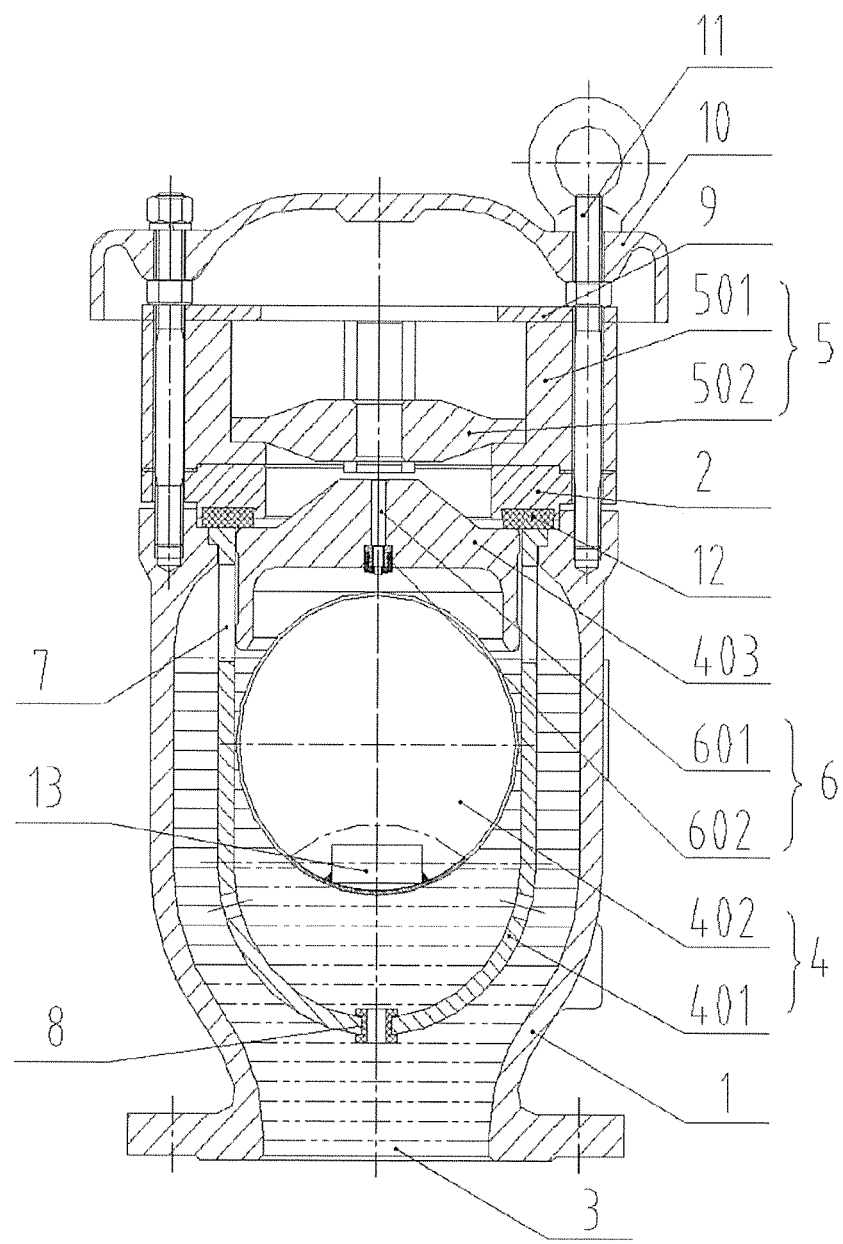
FIG. 4 is structural representation of a trace exhaust valve seat in a working state and entering a trace exhaust state, and a throttle disc not in a working state of a water hammer-proof air valve according to a preferred embodiment of the present invention.

FIG. 1 is a structural representation of a trace exhaust valve seat and a throttle disc both not in a working state of a water hammer-proof air valve according to a preferred embodiment of the present invention. FIG. 2 is a structural representation of a trace exhaust valve seat not in a working state and a throttle disc in a working state of a water hammer-proof air valve according to a preferred embodiment of the present invention. FIG. 3 is a structural representation of a trace exhaust valve seat in a working state and a throttle disc not in a working state of a water hammer-proof air valve according to a preferred embodiment of the present invention. FIG. 4 is structural representation of a trace exhaust valve seat in a working and entering a trace exhaust state, and a throttle disc not in a working state of a water hammer-proof air valve according to a preferred embodiment of the present invention.

As FIG. 1 shows, a water hammer-proof air valve according to the present embodiment comprises a valve body 1 and a bonnet 2. The valve body 1 and the bonnet 2 are fixedly connected. A valve opening 3 for being communicated with a pipeline is provided on the valve body 1, and a high-speed intake and exhaust device 4 for discharging a gas retained in the pipeline during filling the pipeline with water and closing the valve after filling the pipeline with water is completed is provided in an inner cavity of the valve body 1. A bonnet opening is provided on the bonnet 2. An output end of the high-speed intake and exhaust device 4 penetrates the bonnet opening and is communicated with a high-speed exhaust throttling device 5 for limiting an exhaust amount of gas of the high-speed intake and exhaust device 4. An output end of the high-speed exhaust throttling device 5 is communicated with an outside air, and a trace exhaust device 6 for discharging the mixed, remained or separated gas from the pipeline to the outside through the high-speed exhaust throttling device 5 after the high-speed intake and exhaust device 4 closes the valve is further provided in the high-speed intake and exhaust device 4. The water hammer-proof air valve according to the present invention discharges air remaining in the pipeline while filling the pipeline with water. Even during the high-speed exhaust, the air valve will keep open, and no "blowing-block" phenomenon will occur. The valve will not close until an ascending water level closes the high-speed intake and exhaust device 4. The trace exhaust device 6 is integrated inside the high-speed intake and exhaust device 4, having sealed contact, reliable disengagement, sensitive movement, and no adherence phenomenon, and can truly realize an exhaust whenever air presents, an exhaust under full pressure, a complete exhaust, a function of exhaust without drain, a compact structure, a complete function, and an improvement of conveyance efficiency of the pipeline. The high-speed exhaust throttling device 5 designed at an exhaust outlet can input throttling under a set exhaust amount and exhaust pressure difference, which only throttles the high-speed exhaust that may cause water hammer of cavity collapsing, and will not have any effect on high-speed air intake and trace exhaust. A cushion airbag playing a cushion role can be formed in the pipeline, preventing a pressure fluctuation of the pipe network caused by over-speed exhaust. The purposes of water hammer reduction and pipeline safety protection are achieved, and the valve-closing water hammer phenomenon that is unavoidable if the air valves of the prior art is employed is eliminated. The trace exhaust device 6 is integrated inside the high-speed intake and exhaust device 4, having sealed contact, reliable disengagement, sensitive movement, which can truly realize an exhaust whenever air presents, an exhaust under full pressure, a complete exhaust, a function of exhaust without drain, and an improvement of conveyance efficiency of the pipeline. When pressure in the pipeline drops to nearly a negative pressure due to stopping pumping, evacuating, or bursting, the water pressure and the water level in the inner cavity of the air valve fall at the same time, and the valve opens so that the pipeline can suction air, which avoids vacuum or negative pressure occurring in the pipeline, and prevents pipeline collapsing caused by the negative pressure. The high-speed exhaust throttling device 5 only throttles the high-speed air exhaust and does not throttle air intake.

As shown in FIGS. 1, 2, 3, and 4, in the present embodiment, the high-speed intake and exhaust device 4 comprises a casing 401 that is fixedly connected to the bonnet 2 and/or the valve body 1, a floating ball 402 that is located at an inner cavity of the casing 401, and a sliding mass 403 that caps on the floating ball 402 and is capable of sliding up and down along an inner wall of the casing 401 to open or close the valve. Alternatively, the floating ball 402 may adopt a structure that matches the inner cavity of the casing 401. Alternatively, the floating ball 402 may be connected to an internal face of the casing 401 through an engagement of a slider and a chute. Alternatively, the floating ball 402 may be connected to the internal face of the casing 401 through an engagement of a rolling pin or a rolling ball and a chute. Alternatively, the floating ball 402 may be replaced by a floatable sliding structure or a rolling structure, such as a polygon floating mass, a floating disc, or a floating basin having an opening facing down. A ring cavity is formed between the casing 401 and the valve body 1. An exhaust window 7 for guiding the gas in the ring cavity to the output end of the high-speed intake and exhaust device 4 is provided at an upper part of the casing 401. A bottom opening and a side opening for communicating the ring cavity and the inner cavity of the casing 401 are provided at a bottom part of the casing 401. When a water level rises, water enters the inner cavity of the casing 401 also through the bottom opening and the side opening, and acts on the floating ball 402. When the water level falls, water exits from the inner cavity of the casing 401 through the bottom opening and the side opening. A clump weight 13 for making a sealing face of the floating ball 402 always face up is provided in the floating ball 402. A part of the floating ball 402 that carries the clump weight 13 caps on the bottom opening. Air remaining in the pipeline is discharged when the pipeline is filling with water. Even during the high-speed exhaust, the air valve will always keep open, and no "blowing-block" phenomenon occurs. The exhaust opening will not close until the water level rises to a location of the floating ball 402 and lifts the floating ball 402. When pressure in the pipeline falls to nearly the negative pressure due to stopping pumping, evacuating, or bursting, the water pressure and the water level in the inner cavity of the air valve fall at the same time. The sliding mass 403 and the floating ball 402 fall, the valve opens so that the pipeline can suction air, which avoids vacuum or negative pressure occurring in the pipeline and prevents pipeline collapsing caused by the negative pressure.

As shown in FIGS. 1, 2, 3, and 4, in the present embodiment, a plurality of exhaust windows 7 are provided on the casing 401. The plurality of exhaust windows 7 are evenly distributed along a circumference of the casing 401.

As shown in FIGS. 1, 2, 3, and 4, in the present embodiment, a rubber bushing 8 for cushioning a falling force of the floating ball 402 is located at the bottom opening and/or the side opening.

As shown in FIGS. 1, 2, 3, and 4, in the present embodiment, the trace exhaust device 6 comprises an aperture 601 that is located at the sliding mass 403 and penetrates up and down, and a trace exhaust valve seat 602 which is implemented at a bottom part of the aperture 601. An output end of the trace exhaust valve seat 602 is communicated with the aperture 601. The floating ball 402 abuts against and caps on an input end of the trace exhaust valve seat 602. Alternatively, the trace exhaust device 6 comprises an aperture 601 that is provided on the sliding mass 403 and penetrates up and down, and an aperture plug that is fixedly connected to the floating ball 402. The aperture plug abuts against and caps on the aperture 601. Alternatively, the trace exhaust device 6 comprises a trace exhaust pipe that communicates the inner cavity of the casing 401 and the valve opening 3 of the bonnet 2. An intake end of the trace exhaust pipe is fixedly connected between the sliding mass 403 and the floating ball 402, and the floating ball abuts against and seals the intake end of the trace exhaust pipe.

As shown in FIGS. 1, 2, 3, and 4, in the present embodiment, the high-speed exhaust throttling device 5 comprises a throttle tube 501 that is fixedly connected to the bonnet 2 and/or the valve body 1, and a throttle disc 502 that is located at an inner cavity of the throttle tube 501 and can slide up and down along an internal face of the throttle tube 501 to automatically adjust an exhaust amount of gas. A throttle orifice is provided on the throttle disc 502. Alternatively, the throttle disc 502 is sleeved on a guide rod which is distributed along an axial direction of the throttle tube 501, and a plurality of throttle orifices are distributed evenly at a circumference of the throttle disc 502. Alternatively, the high-speed exhaust throttling device 5 comprises a throttle tube 501 that is fixedly connected to the valve opening 3 of the valve body 1, and a throttle disc 502 that can reciprocally move along the axial direction of the throttle tube 501 to automatically adjust the exhaust amount of gas. The throttle disc 502 is connected to the internal face of the throttle tube 501 through an engagement of a slider and a chute, or the throttle disc 502 is connected to the internal face of the throttle tube 501 through an engagement of a rolling ball and a rolling chute, or the throttle disc 502 is connected to the internal face of the throttle tube 501 through an engagement of a rolling pin and a rolling chute. Alternatively, the high-speed exhaust throttling device 5 comprises a throttle tube 501 that is fixedly connected to the valve opening 3 of the valve body 1, and a basin plug located in the inner cavity of the throttle tube 501. An opening of the basin plug is facing down and a bottom of the basin plug is facing up. An external diameter of the basin plug is less than a radial dimension of the throttle tube 501 and greater than an axial dimension of the throttle tube 501, which prevents the basin plug from turning over. The basin plug fully uses an airflow pushing force and its own weight to move up and down. The external dimension of the basin plug is greater than a caliber dimension of openings at both ends of the throttle tube 501.

As shown in FIGS. 1, 2, 3, and 4, in the present embodiment, a sealing disc 9 that prevents a contamination from entering the valve body 1 and forms a contact with the throttle disc 502 that is ascending to limit an exhaust rate of a high-speed airflow is located at a top part of the high-speed exhaust throttling device 5.

As shown in FIGS. 1, 2, 3, and 4, in the present embodiment, a shield 10 for preventing a contamination from entering the valve body 1 is located at the output end of the high-speed exhaust throttling device 5.

As shown in FIGS. 1, 2, 3, and 4, in the present embodiment, at least two of the shield 10, the high-speed exhaust throttling device 5, the bonnet 2, and the valve body 1 are fixedly connected by a connecting piece.

As shown in FIGS. 1, 2, 3, and 4, in the present embodiment, a sealing ring 12 is located between the high-speed exhaust throttling device 5 and the bonnet 2, and/or between the bonnet 2 and the valve body 1.

A water hammer-proof exhaust method for the pipeline in-use according to the present embodiment, comprising: a) the pipeline changes from the initial state into the water filling and exhaust state, the gas in the pipeline enters the inner cavity of the valve body 1 through the inlet of the valve body 1, the airflow enters the upper part of the valve body 1 through the ring cavity between the valve body 1 and the casing 401, the airflow is then discharged to the outside atmosphere through the exhaust window 7 of the casing 401, the bonnet opening of the bonnet 2, the flow surface between the throttle disc 502 and the throttle tube 501, the sealing disc 9 and the shield 10; b) as the exhaust rate keeps increasing, the exhaust pressure difference increases to the design value, the throttle disc 502 is blown up by the airflow and blocks the exhaust opening on the throttle tube 501, leaving only the throttle orifice on the throttle disc 502 for exhaust; c) as the gas in the pipeline is discharged, the exhaust rate and the exhaust pressure difference will gradually decrease, the airflow pushing force subjected by the throttle disc 502 will also gradually decrease, when the dead-weight of the throttle disc 502 is greater than the airflow pushing force, the throttle disc 502 will fall to the bottom part of the throttle tube 501 and returns to the initial location; at this moment, the water level rises, enters the inner cavity of the valve body 1, and drowns the floating ball 402 and the sliding mass 403, the floating ball 402 and sliding mass 403 float upward with the water level, the sealing face of the sliding mass 403 contacts with the sealing ring 12, forming a sealing of the exhaust opening of the high-speed intake and exhaust device 4; the upper part of the floating ball 402 contacts with the sealing face of the trace exhaust valve seat 602, forming a sealing of the trace exhaust opening; as the water pressure in the valve body 1 increases, the seal specific pressure at the sealing part is increased, the valve closes, and neither water nor the gas can be discharged through the valve, realizing the sealing of the valve; d) after the valve closes, when the gas is separated out from the pipeline, the separated gas gradually gathers to the upper part of the valve body 1 of the high-speed intake and exhaust device 4 which is located at the high point of the pipeline; as the gathered air increases, the air pressure rises to exceed the water pressure, on one hand keeping the sliding mass 403 staying in the sealing state, on the other hand making the water level that drowns the floating ball 402 fall, the floating ball 402 falls with the water level and opens the sealing at the trace exhaust valve seat 602, and the trace exhaust valve seat 602 starts to exhaust; when the gathered air pressure decreases, the water level rises, and the floating ball 402 ascends with the water level and seals the trace exhaust valve seat 602 again; and e) when the pipeline stops pumping, starts evacuating, or bursts, the water level in the air valve falls, the outside air pressure is greater than the water pressure in the pipeline, the sliding mass 403 and the floating ball 402 fall due to the decreases of the water pressure and the water level, the intake and exhaust opening of the high-speed intake and exhaust device 4 opens, and massive outside air is suctioned into the pipeline to eliminate vacuum in the pipeline.

During implementation, it is provided a water hammer-proof air valve, comprising a valve body 1, a casing 401, a floating ball 402, a trace exhaust valve seat 602, a sliding mass 403, a sealing ring 12, a bonnet 2, a throttle disc 502, a throttle tube 501, a sealing disc 9, a shield 10, a connecting piece 11, and a rubber bushing 8. The casing 401 is mounted in the valve body 1. The sealing ring 12 and the bonnet 2 are mounted at an exit end of the valve body 1. Exhaust windows 7 are distributed evenly at the casing 401. The floating ball 402 and the sliding mass 403 are located in the casing 401. The trace exhaust valve seat 602 is located at a lower part of the sliding mass 403. The floating ball 402 is located under the sliding mass 403, contacting with a sealing face of the trace exhaust valve seat 602 mounted in the sliding mass 403, which is together located in the casing 401. The casing 401 is located in the valve body 1, is capped by the bonnet 2 and the sealing ring 12, and is connected to an upper part of the valve body 1 through the connecting piece 11. The throttle disc 502 is mounted in the throttle tube 501. The sealing disc 9 is located on an upper part of the throttle tube 501. The shield 10 is connected to a structure beneath the connecting piece 11 through the connecting piece 11 into one unit.

The present water hammer-proof air valve uses unique structural formation to integrate and design the high-speed intake and exhaust device 4, the trace exhaust device 6, and the high-speed exhaust throttling device 5 into one compact unit. The valve body 1, the casing 401, the floating ball 402, the sliding mass 403, the sealing ring 12 and the bonnet 2 form the high-speed intake and exhaust device 4. The floating ball 402, the trace exhaust valve seat 602 and the sliding mass 403 form the trace exhaust device 6. The throttle tube 501, the throttle disc 502 and the sealing disc 9 form the high-speed exhaust throttle device 5.

As FIG. 1 shows, the initial state of the valve of the water hammer-proof air valve: the floating ball of the water hammer-proof air valve is located at the bottom part of the casing 401. An additional weight (the clump weight 13) is located at an lower end of the floating ball 402, making its sealing face always face up. A lower surface of the additional weight (the clump weight 13) contacts with the rubber bushing 8 located at the bottom part of the casing 401, while the upper part of the clump weight 13 contacts with the sealing face of the trace exhaust valve seat 602, and supports the sliding mass 403 through the trace exhaust valve seat 602. Both the floating ball 402 and the sliding mass 403 can move up and down with a limited length without hindrance in the casing 401, under an effect of vertical force. The throttle disc 502 is located at the bottom part of the throttle tube 501 due to its own weight. An exhaust path between the throttle tube 501 and the throttle disc 502 is in a state of maximum flow area.

As FIG. 1 shows, the high-speed exhaust state of the water hammer-proof air valve: when the pipeline is filling water and discharges air, the gas in the pipeline enters the valve body 1 through a bottom inlet (the valve opening 3) of the valve body 1. The airflow enters the upper part of the valve body 1 through the empty ring cavity between the valve body 1 and the casing 401. The airflow is then discharged to the outside atmosphere through the exhaust windows 7 of the casing 401, the bonnet opening of the bonnet 2, the flow surface between the throttle disc 502 and the throttle tube 501, the sealing disc 9, and the shield 10. An amount of gas that enters the casing 401 through the rubber bushing 8 and side opening is less than 3% of the gas at the inlet of the valve body 1, moving upward along gaps among the floating ball 402, the sliding mass 403 and the casing 401. But under the effect of gravity of the floating ball 402 and the sliding mass 403, as well as an horizontal airflow at the window of the casing 401 above the sliding mass 403, this portion of airflow cannot blow and move the floating ball 402 and the sliding mass 403 upward to the location of the sealing ring 12. Therefore, no blowing-block phenomenon will occur during the high-speed exhaust.

As FIG. 2 shows, the throttling exhaust state of the water hammer-proof air valve: as the exhaust rate keeps increasing and the exhaust pressure difference increases to the design value (i.e. a speed of moving toward one another of cavities collapsing water column increases and is about to close) the throttle disc 502 is blown up by the airflow, and blocks the exhaust opening of the throttle tube 501, leaving only the exhaust opening at a centre of the throttle disc 502 for exhaust. At this moment, the exhaust area decreases (decreases for more than 70%), the exhaust amount of gas of the water hammer-proof air valve drops quickly. The retained gas in the pipeline forms a cushion airbag, decreasing the closing speed of the water column that moves toward one another. However, at this moment, the exhaust of the throttle disc 502 is continuing, just the exhaust amount of gas decreases, and the valve is not closed, and thus it will not cause valve-closing water hammer of the air valve. The cushion airbag formed in the pipeline due to the throttling exhaust can effectively eliminate water hammer of cavity collapsing, preventing the pressure fluctuation of the pipe network caused by over-speed exhaust.

As FIG. 3 shows, the closed and sealing state of the water hammer-proof air valve. As the gas in the pipeline is discharged, the exhaust rate and the exhaust pressure difference will gradually decrease, and the airflow pushing force subjected by the throttle disc 502 will also gradually decrease. When the dead-weight of the throttle disc 502 is greater than the airflow pushing force, the throttle disc 502 will fall to the bottom part of the throttle tube 501 and returns to the initial location. At this moment, the water level rises, enters the valve body 1, and drowns the floating ball 402 and the sliding mass 403. The floating ball 402 and the sliding mass 403 (both the floating all 402 and the sliding mass 403 are lighter than water and are floatable in water) will float upward. The sealing face of the sliding mass 403 contacts with the sealing ring 12 to form a sealing of high-speed intake and exhaust opening. The upper part of the floating ball 402 contacts with the sealing face of the trace exhaust valve seat 602 to seal the trace exhaust opening. As the water pressure in the valve body 1 increases, the seal specific pressure at the sealing part is increased. The valve closes, preventing both water and gas from being discharged through the valve.

As FIG. 4 shows, the trace exhaust state of the water hammer-proof air valve: after the valve closes, the mixed, remained or separated gas in the pipeline gradually gathers to the upper part of the valve body 1 which is mounted at a local high point of the pipeline. When the gas accumulated here increases, air pressure will gradually rise. When this air pressure is greater than the water pressure here, on one hand making the sliding mass 403 withstand its sealing face to and keep the sealing state with the sealing ring 12, on the other hand making the water level that drowns the floating ball 402 fall, the floating ball 402 falls accordingly to open the sealing at the trace exhaust valve seat 602, and the trace exhaust valve seat 602 starts to exhaust. Exhaust at the trace exhaust valve seat 602 causes the gather air pressure here to decrease, and the water level to rise. The floating ball 402 then ascends with the water level and seals the trace exhaust valve seat 602, allowing air to be discharged through the trace exhaust valve seat 602, but water can't. This structure of the trace exhaust valve realizes an exhaust whenever air presents, a closing after exhaust completes, an exhaust with pressure, and a function of exhaust without drain. It can exhaust maximum gas present in the pipeline away.

As FIG. 1 shows, a suction state under negative pressure of the water hammer-proof air valve: when the pipeline stops pumping, evacuates, or bursts, the water level in the air valve falls. The outside air pressure is greater than the water pressure in the pipeline. The sliding mass 403 and the floating ball 402 fall due to decreases of the water pressure and the water level. The high-speed intake and exhaust opening opens, and immediately suctions the outside air to eliminate vacuum in the pipeline. The sliding mass 403 uses ultra-high molecular weight polyethylene material. The sealing surface is very smooth and never rusts, has a small contact area with the rubber sealing ring 12, will not cause the adherence phenomenon due to long time sealing, and thus can timely, sensitively and reliably disengage the sealing instantaneously when the negative pressure occurs.

The present water hammer-proof air valve has following beneficial effects:

i) The trace exhaust device 6 is integrated inside the high-speed intake and exhaust device 4, has a compact structure and a complete function.

ii) The trace exhaust valve seat 602 uses a stainless steel skeleton lining structure, and is inlayed in the sliding mass 403 which is lighter than water. It has small volume and small contact area with the stainless floating ball 402, preventing the phenomenon of adherence.

iii) A sealing pair of the high-speed intake and exhaust opening is realized by the sealing in a plain form of the sliding mass 403 that is made of the ultra-high molecular weight polyethylene material and the rubber sealing ring 12. The floating ball 402 does not involve in the sealing of the high-speed intake and exhaust actions. The sliding mass 403 and the rubber sealing ring 12 will have engagement of the sealing pair and the phenomenon of adherence. The contact and disengagement of the sealing pair is quick and reliable.

iv) The floating ball 402 and the sliding mass 403 are located in the casing 401 which has a window at the top part. Its assembly location and structure aerodynamically makes a total force applied on the sliding mass 403 and the floating ball 402 is always vertical and downward when the high-speed airflow is discharged. It will not cause, when the high-speed airflow is discharged, movement of the floating ball 402 and the sliding mass 403 upward to cause blowing-block.

v) Structure form of the high-speed exhaust throttling device 5, and the opening and weight of the throttle disc 502, determined by comprehensive calculation, fluid simulation and working condition testing, allow the high-speed exhaust throttling device 5 to work under a set exhaust flowrate and exhaust pressure difference. It will only throttle the high-speed exhaust that may cause water hammer of cavity collapsing, but will not have any effect on high-speed intake and trace exhaust. The cushion airbag playing a cushion role can be formed in the pipeline, preventing the pressure fluctuation in the pipe network caused by over-speed exhaust. The purposes of water hammer reduction and pipeline safety protection are achieved.

The high-speed exhaust throttling device 5 that is designed at the exhaust outlet can input throttling under the set exhaust amount and exhaust pressure difference, avoiding the blowing-block phenomenon during the high-speed exhaust, which can eliminate the valve-closing water hammer phenomenon that is unavoidable if the air valves of the prior art is employed. The trace exhaust valve that is of unique design and compact structure is integrated inside the high-speed intake and exhaust device 4, having reliable sealing, contact and disengagement, sensitive movement, and no adherence phenomenon, and can truly realize an exhaust whenever air presents, an exhaust under full pressure, a complete exhaust, and a function of exhaust without drain. The high-speed intake and exhaust opening uses the sliding mass 403 that is made of the ultra-high molecular weight polyethylene material to contact with the rubber sealing ring 12 to form a ring plain sealing. The movement of engagement and disengagement of the sealing is sensitive, quick and reliable, and there is no adherence. A reliable seal is enabled when the high-speed exhaust is completed, and under negative pressure suction, it can open a suction port instantaneously and suction massive amount of air. The sliding mass 403, the floating ball 402, and the trace exhaust valve seat 602 are located in the casing 401. The structure designed based on aerodynamics principles prevents the floating ball 402 and the sliding mass 403 from causing blowing-block during the high-speed exhaust. Moreover, both the floating ball 402 and the sliding mass 403 are under protection of the casing 401. The sliding mass 403 contacts with the upper sealing ring 12 when moving upward. The upper surface of the stainless floating ball 402 contacts with the rubber sealing face of the trace exhaust valve seat 602, while the bottom surface contacts with the rubber bushing 8 inlayed in the casing 401. Without rough contact by metals, the contact surface is not easy to damage and has long service life.

The water hammer-proof air valve comprises: the high-speed intake and exhaust device 4; the trace exhaust device 6 (i.e. the sliding mass 403+the trace exhaust valve seat 602+the floating ball 402); and the high-speed exhaust throttling device 5.

The arrangement of the high-speed throttling device 5 can throttle the high-speed exhaust, but doesn't not throttle air intake. The cushion airbag is formed in the pipeline, preventing the water hammer phenomenon caused by a constant high-speed exhaust.

The trace exhaust valve seat 602 is compactly integrated in the high-speed intake and exhaust valve. It can realize an exhaust whenever air presents, a closing after exhaust completes, an exhaust under full pressure, a complete exhaust, and a function of exhaust without drain.

The floating ball 402, the sliding mass 403, and the trace exhaust valve seat 602 are located in the casing 401. The floating ball 402 and the sliding mass 403 will not cause blowing-block during the high-speed exhaust, preventing the air valve-closing water hammer. After water enters the casing 401, the floating ball 402, the sliding mass 403 and the trace exhaust valve seat 602 can close the valve and prevent the valve from leakage. The mixed, remained or separated gas in water will gather above the floating ball 402 and beneath the sliding mass 403. After the gathered gas increases, its pressure increases, making the water level falls, the floating ball 402 falls accordingly. A small exhaust opening of the trace exhaust valve seat 602 is opened to perform trace exhaust. After the gas here is discharged, the air pressure decreases and the water level rises. The floating ball 402 ascends to block the trace exhaust valve seat 602 again and realizes sealing again. Then as the gas separated out from the water increases again, the above-described process will repeat.

The water hammer-proof air valve according to the present invention has four functions: when filling water, it can exhaust quickly and massively without causing blowing-block, preventing the air valve from closing suddenly, which generates the air valve-closing water hammer; it will automatically throttle during the over-speed exhaust to limit the exhaust rate, preventing the generation of the water hammer that caused by the over-speed and massive exhaust and high-speed closing of the water column moving toward one another, and avoiding the pressure fluctuation in the pipe network caused by the over-speed exhaust; after exhaust is completed and the pipeline is filled with water, it can perform the trace exhaust with pressure, discharging the remained, mixed or separated gas in water, improving the conveyance efficiency of the pipeline; and when the pipeline is empty, it will quickly suction air without hindrance, preventing the occurrence of negative pressure or vacuum in the pipeline, avoiding the pipeline from flattening and collapsing.

The description above is only the preferred embodiments of the present invention, and does not intend to limit the present invention. To those skilled in the art, the present invention may have various modifications and variations. Any modification, equivalent replacement, improvement and the like made within the spirit and the principle of the present invention should be all included in the scope of protection of the present invention.

The invention claimed is:

1. A water hammer-proof air valve, comprising a valve body and a bonnet,
    the valve body fixedly connected with the bonnet,
    a valve opening, for being communicated with a pipeline provided on the valve body,
    an intake and exhaust device disposed in an inner cavity of the valve body, for discharging a gas retained in the pipeline to an outside as the pipeline is filled with water and closing a valve after the pipeline is filled with water, the intake and exhaust device comprises: a casing fixedly connected to the bonnet and/or the valve body, a floating ball located in an inner cavity of the casing, and a sliding mass capping the floating ball and capable of sliding up and down along an inner wall of the casing to open or close the valve,
    a bonnet opening provided on the bonnet,
    an output end of the intake and exhaust device penetrating the bonnet opening and communicated with an exhaust throttling device, for limiting an exhaust amount of gas of the intake and exhaust device, wherein the exhaust throttling device comprises a throttle tube,
    an output end of the exhaust throttling device communicated with outside air, and
    an exhaust device, for discharging the gas separated out from the pipeline to the outside through the exhaust throttling device after the intake and exhaust device closes the valve, disposed in the intake and exhaust device, wherein the exhaust device comprises an aperture,
    wherein a sealing ring is located between the bonnet and the valve body, and the sealing ring seals against all of the valve body, the bonnet, the casing and the sliding mass.

2. The water hammer-proof air valve according to claim 1, wherein,
    the throttle tube is fixedly connected to the bonnet and/or the valve body, and the exhaust throttling device further comprises a throttle disc that is located at an inner cavity of the throttle tube, wherein the throttle disc slides up and down along an internal face of the throttle tube to automatically adjust the exhaust amount of gas; and
    a throttle orifice is provided on the throttle disc.

3. The water hammer-proof air valve according to claim 2, wherein,
    a sealing disc, that prevents a contamination from entering the valve body and forms a contact with the throttle disc that is ascending to limit an exhaust rate of an airflow, is located at a top part of the exhaust throttling device.

4. The water hammer-proof air valve according to claim 1, wherein,
    a shield, for preventing a contamination from entering the valve body, is located at the output end of the exhaust throttling device.

5. The water hammer-proof air valve according to claim 4, wherein,
    at least two of the shield, the exhaust throttling device, the bonnet, and the valve body are fixedly connected by a connecting piece.

6. The water hammer-proof air valve according to claim 1, wherein,
    a ring cavity is formed between the casing and the valve body,
    at least one exhaust window, for guiding the gas in the ring cavity to the output end of the intake and exhaust device, is provided at an upper part of the casing, and
    a bottom opening and a side opening, for communicating the ring cavity and the inner cavity of the casing, are located at a bottom part of the casing; and
    a clump weight, for making a sealing face of the floating ball always face up, is located in the floating ball, and
    a part of the floating ball that carries the clump weight caps the bottom opening.

7. The water hammer-proof air valve according to claim 6, wherein,
    the at least one exhaust window comprises a plurality of exhaust windows provided on the casing; and
    the plurality of exhaust windows are evenly distributed along a circumference of the casing.

8. The water hammer-proof air valve according to claim 6, wherein,
    a rubber bushing, for cushioning a falling force of the floating ball, is located at the bottom opening and/or the side opening.

9. The water hammer-proof air valve according to claim 6, wherein,
    the aperture extends through the sliding mass, and the exhaust device further comprises an exhaust valve seat that is mounted at a bottom part of the aperture; and
    an output end of the exhaust valve seat is communicated with the aperture, and
    the floating ball abuts against and caps an input end of the exhaust valve seat.

* * * * *